(12) United States Patent
Wi et al.

(10) Patent No.: US 12,515,645 B2
(45) Date of Patent: Jan. 6, 2026

(54) APPARATUS AND METHOD FOR COLLISION AVOIDANCE ASSISTANCE

(71) Applicants: HYUNDAI MOTOR COMPANY, Seoul (KR); KIA CORPORATION, Seoul (KR)

(72) Inventors: Hyoung Jong Wi, Seoul (KR); Dong Hyun Sung, Hwaseong-si (KR); Yong Seok Kwon, Suwon-si (KR); Sang Yeob Lee, Hwaseong-si (KR); Tae Geun An, Yeongju-si (KR); Joon Ho Lee, Seoul (KR); Eung Seo Kim, Gwacheon-si (KR); Sang Min Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 237 days.

(21) Appl. No.: 18/517,906

(22) Filed: Nov. 22, 2023

(65) Prior Publication Data
US 2024/0262348 A1    Aug. 8, 2024

(30) Foreign Application Priority Data

Feb. 6, 2023    (KR) ........................ 10-2023-0015657

(51) Int. Cl.
*B60W 40/072*    (2012.01)
*B60W 10/18*    (2012.01)
(Continued)

(52) U.S. Cl.
CPC ............ *B60W 30/09* (2013.01); *B60W 10/18* (2013.01); *B60W 30/0956* (2013.01);
(Continued)

(58) Field of Classification Search
CPC .. B60W 30/09; B60W 10/18; B60W 30/0956; B60W 40/072; B60W 40/08; B60W 2420/408; B60W 2540/12; B60W 2552/30; B60W 2552/50; B60W 2554/20; B60W 2540/18; B60W 2710/18; B60W 30/08; B60W 30/095; B60W 30/0953; B60W 40/09; B60W 2420/40; B60W 40/02; B60W 2510/18; B60W 2510/20; G01S 17/931; B60Y 2300/095
See application file for complete search history.

(56) References Cited

U.S. PATENT DOCUMENTS 9,529,087 B2    12/2016    Stainvas et al.
10,308,245 B2    6/2019    Lee et al.
(Continued)

FOREIGN PATENT DOCUMENTS

CN    108344997 B    10/2021
CN    113591640 A    11/2021
(Continued)

*Primary Examiner* — Daniel M. Robert
(74) *Attorney, Agent, or Firm* — Lempia Summerfield Katz LLC

(57) ABSTRACT

A collision avoidance assistance device and method determine a risk of collision with a structure such as a guardrail present in a driving path using information obtained by a front-side light detection and ranging (LiDAR) sensor and a front camera, and then enable desirable braking control.

20 Claims, 14 Drawing Sheets

(51) Int. Cl.
  *B60W 30/09* (2012.01)
  *B60W 30/095* (2012.01)
  *B60W 40/08* (2012.01)
  *G01S 17/931* (2020.01)

(52) U.S. Cl.
  CPC .......... *B60W 40/072* (2013.01); *B60W 40/08* (2013.01); *G01S 17/931* (2020.01); *B60W 2420/408* (2024.01); *B60W 2540/12* (2013.01); *B60W 2552/30* (2020.02); *B60W 2552/50* (2020.02); *B60W 2554/20* (2020.02)

(56) References Cited

U.S. PATENT DOCUMENTS

| | | | |
|---|---|---|---|
| 10,351,128 B2 | 7/2019 | Sung et al. | |
| 2011/0022317 A1* | 1/2011 | Okita | G08G 1/161 |
| | | | 701/301 |
| 2011/0187515 A1* | 8/2011 | Saito | B60W 30/0956 |
| | | | 701/1 |
| 2013/0332112 A1* | 12/2013 | Nakamura | G01S 17/66 |
| | | | 702/181 |
| 2015/0120138 A1* | 4/2015 | Zeng | G01S 13/931 |
| | | | 701/41 |
| 2016/0280263 A1* | 9/2016 | Mori | B62D 15/027 |
| 2017/0080952 A1* | 3/2017 | Gupta | B62D 15/0265 |
| 2017/0291603 A1* | 10/2017 | Nakamura | B60W 30/09 |
| 2018/0162386 A1 | 6/2018 | Lee et al. | |
| 2018/0162387 A1 | 6/2018 | Sung et al. | |
| 2019/0061750 A1* | 2/2019 | Tamura | B60W 30/0956 |
| 2020/0139962 A1* | 5/2020 | Kim | B60W 10/18 |
| 2020/0164873 A1* | 5/2020 | Nanri | B60W 50/0097 |
| 2021/0009117 A1* | 1/2021 | Emura | B60Q 5/006 |
| 2021/0046940 A1* | 2/2021 | Feser | G01B 11/24 |
| 2021/0053563 A1* | 2/2021 | Li | G05D 1/0088 |
| 2024/0101105 A1* | 3/2024 | Huang | G06V 20/58 |
| 2024/0262348 A1* | 8/2024 | Wi | B60W 30/095 |

FOREIGN PATENT DOCUMENTS

| | | |
|---|---|---|
| JP | 2019021317 A | 2/2019 |
| KR | 20140052496 A | 5/2014 |
| KR | 101655682 B1 | 9/2016 |
| KR | 20180065585 A | 6/2018 |
| KR | 20180066524 A | 6/2018 |
| KR | 102169889 B1 | 10/2020 |
| KR | 102201412 B1 | 1/2021 |

\* cited by examiner

APPARATUS AND METHOD FOR COLLISION AVOIDANCE ASSISTANCE

This application claims the benefit of and priority to Korean Patent Application No. 10-2023-0015657, filed on Feb. 6, 2023, which is hereby incorporated by reference as if fully set forth herein.

BACKGROUND

Technical Field

The present disclosure relates to a collision avoidance assistance device and a method that determine the risk of collision with a structure such as a guardrail in a driving path using information obtained by a front-side light detection and ranging (LiDAR) sensor and a front camera and then enables appropriate braking control.

Discussion of the Related Art

In general, a forward collision avoidance assistance system may prevent a collision with an object that is ahead of a vehicle. The system may help avoid a collision by first determining whether there is a potential collision with the object, i.e., another vehicle, a pedestrian, etc., using a front camera and a front radar installed in the vehicle and then by warning a driver of the potential collision and automatically controlling a braking system of the vehicle and performing braking accordingly.

This forward collision avoidance assistance system may transmit a maximum braking force when the driver presses hard on the brake pedal in a situation where there is a risk of collision to enable emergency braking. The system may turn off the system when the driver presses hard on an accelerator pedal to enable desirable vehicle control according to the intention of the driver.

However, such a typical forward collision avoidance assistance system may determine only whether there is a risk of collision with a vehicle and a pedestrian present in a forward driving path of the vehicle. However, for a structure such as a guardrail that is not recognizable as an obstacle by the front camera, or a polyethylene (PE) barrier that is successively installed on a guardrail, the typical system may not enable desirable braking control.

Accordingly, for an object that is not recognized by the front camera, such as a guardrail, whether there is a risk of collision is determined using a front-side light detection and ranging (LiDAR) sensor, and it is necessary to select a representative value to specify an object that is a target of the determination. However, when a guardrail is present in the driving path of the vehicle, it is difficult to select the representative value because a guardrail can be a single lengthy extending object. Control performed based on an inaccurately selected representative value for such a difficult to determine object may lead to sensitive control or erroneous control.

SUMMARY

To solve the technical issues described above, objects of the present disclosure are to provide a collision avoidance assistance device and method that may determine a risk of collision with a structure such as a guardrail that is present in a driving path of a vehicle using information obtained by a front-side light detection and ranging (LiDAR) sensor and a front camera and may thereby enable desirable braking control.

According to an aspect of the present disclosure, a collision avoidance assistance device is provided. The device includes a target point selector configured to select, as a target point, at least one point present within a vehicle width of a vehicle from among contour points obtained from a LiDAR sensor provided in the vehicle. The device also includes an intersection point calculator configured to determine whether there are intersection points at which line segments, each connecting two contour points, interest with longitudinal extension lines of left and right end points of the vehicle. The intersection point calculator is also configured to determine the line segments of the intersection points. The device also includes an overlap calculator configured to calculate a degree of overlap between the vehicle and a structure based on the target point and the intersection points. The device also includes a path closure determiner configured to determine a closure degree to which a driving path of the vehicle is closed by the structure recognized by the LiDAR sensor based on the degree of overlap. The device also includes a control timing determiner configured to determine a control time for braking control of the vehicle using the closure degree of the driving path and operation information of a driver operating the vehicle.

In at least one embodiment of the present disclosure, the target point selector is configured to calculate a lateral offset value between each of the contour points and a center of a front bumper of the vehicle based on a heading direction of the vehicle. The target point selector may also be configured to select, as the target point, a point at which the calculated lateral offset value is within the vehicle width of the vehicle.

In at least one embodiment of the present disclosure, the target point selector is configured to select, as the target point, a point having a smallest lateral offset value with respect to the vehicle.

In at least one embodiment of the present disclosure, the overlap calculator is configured to calculate the degree of overlap by dividing, by the vehicle width ($w_{width}$), a difference between half ($w_{width}/2$) of the vehicle width of the vehicle and a lateral offset at the target point.

In at least one embodiment of the present disclosure, the path closure determiner is configured to determine that a structure in front is blocking an entirety of the path of the vehicle when the intersection point is present both on a left side (Edge L) and a right side (Edge R) of the vehicle. The path closure determiner may also be configured to determine that the structure in front is blocking only a portion of the path of the vehicle when the intersection point is present on one of the left side (Edge L) or the right side (Edge R) of the vehicle.

In at least one embodiment of the present disclosure, the control timing determiner is configured to determine a risk of collision based on a driving state of the vehicle, a driving state of the driver, or a road environment, and to determine whether to vary the control time based on the risk of collision.

In at least one embodiment of the present disclosure, the control timing determiner is configured to determine whether there is an avoidable space within a lane based on the degree of overlap of the target point and the intersection point when the intersection point is present only on one side without blocking the entire path of the vehicle. The control timing determiner may also be configured to determine the risk of collision to be low in the presence of the avoidable space and to determine the control time such that the braking control is executed later than a preset reference time.

In at least one embodiment of the present disclosure, the control timing determiner is configured to, when there are no other obstacles or structures in a predicted steering space according to a change in curvature of a curved road on which the vehicle travels, determine the risk of collision with a structure generating the intersection point to be low, and determine the braking control to be executed at a time later than a preset reference time.

In at least one embodiment of the present disclosure, the control timing determiner is configured to, when it is determined that, even though a structure is blocking the entire path of the vehicle, the driver is braking by stepping on a brake pedal of the vehicle, determine the risk of collision to be low and determine the braking control to be executed at a time later than a preset reference time.

In at least one embodiment of the present disclosure, the control timing determiner is configured to, when it is determined that, even though a structure is blocking the entire path of the vehicle, the driver is steering with a turn signal on, determine the risk of collision to be low and determine the braking control to be executed at a time later than a preset reference time.

According to another aspect of the present disclosure, a collision avoidance assistance method is provided. The method includes a target point selection step of selecting, as a target point, at least one point present within a vehicle width of a vehicle from among contour points obtained from a LiDAR sensor provided in the vehicle. The method also includes an intersection point calculation step of determining whether there are intersection points at which line segments, each connecting two contour points, intersect with longitudinal extension lines of left and right end points of the vehicle, and of determining the line segments of the intersection points. The method also includes an overlap calculation step of calculating a degree of overlap between the vehicle and a structure based on the target point and the intersection point. The method also includes a path closure determination step of determining a closure degree to which a driving path of the vehicle is closed by the structure recognized by the LiDAR sensor based on the degree of overlap. The method also includes a control timing determination step of determining a control time for braking control of the vehicle using the closure degree of the driving path and operation information of a driver operating the vehicle.

In at least one embodied method of the present disclosure, the target point selection step includes, based on a heading angle of the vehicle, calculating a lateral offset value between each of the contour points and a center of a front bumper of the vehicle. The target point selection step may also include selecting, as the target point, a point at which the calculated lateral offset value is within the vehicle width of the vehicle.

In at least one embodied method of the present disclosure, the target point selection step includes selecting, as the target point, a point having a smallest lateral offset value with respect to the vehicle.

In at least one embodied method of the present disclosure, the overlap calculation step includes calculating the degree of overlap by dividing, by the vehicle width ($w_{width}$), a difference between half ($w_{width}/2$) of the vehicle width of the vehicle and a lateral offset at the target point.

In at least one embodied method of the present disclosure, the path closure determination step includes determining that a structure in front is blocking an entirety of the path of the vehicle when the intersection point is present both on a left side (Edge L) and a right side (Edge R) of the vehicle. The patch closure determination step may also include determining that the structure in front is blocking only a portion of the path of the vehicle when the intersection point is present on one of the left side (Edge L) or the right side (Edge R) of the vehicle.

In at least one embodied method of the present disclosure, the control timing determination step includes determining a risk of collision based on a driving state of the vehicle, a driving state of the driver, or a road environment, and determining whether to vary the control time based on the risk of collision.

In at least one embodied method of the present disclosure, the control timing determination step includes determining whether there is an avoidable space within a lane based on the degree of overlap between the target point and the intersection point when the intersection point is present only on one side without blocking the entire path. The control timing determination step may also include determining the risk of collision to be low in the presence of the avoidable space and determining the control time such that the braking control is executed later than a preset reference time.

In at least one embodied method of the present disclosure, the control timing determination step includes, when there are no other obstacles or structures in a predicted steering space according to a change in curvature of a curved road on which the vehicle travels, determining the risk of collision with a structure generating the intersection point to be low, and determining the braking control to be executed at a time later than a preset reference time.

In at least one embodied method of the present disclosure, the control timing determination step includes, when it is determined that, even though a structure is blocking the entire path of the vehicle, the driver is braking by stepping on a brake pedal, determining the risk of collision to be low and determining the braking control to be executed at a time later than a preset reference time.

In at least one embodied method of the present disclosure, the control timing determination step includes, when it is determined that, even though a structure is blocking the entire path of the vehicle, the driver is steering with a turn signal on, determining the risk of collision to be low and determining the braking control to be executed at a time later than a preset reference time.

According to various embodiments of the present disclosure as described above, varying a braking control time for a vehicle, based on a degree to which a structure such as a guardrail, a lane separation rod, a steel median strip, a polyethylene (PE) barrier, or the like that is present in front or on sides of a vehicle closes a driving path, may improve driving safety.

In addition, selecting a representative value for recognizing a lengthy structure as a target point, selected based on a lateral offset with the center of a front bumper of the vehicle, may prevent the collision avoidance assistance device from being sensitively controlled or incorrectly controlled by an incorrectly selected representative value.

In addition, maintaining or delaying a time at which braking control is to be executed to a reference time, based on a risk of collision determined based on a degree to which a structure closes a driving path of the vehicle, a braking operation or steering operation of a driver of the vehicle, and the like, may enable braking control without a sense of difference from a driving intention of the driver.

The effects to be obtained from the present disclosure are not limited to those described above. Other effects not described above should be more apparent to one of ordinary skill in the art to which the present disclosure pertains from the following description.

DETAILED DESCRIPTION OF THE DISCLOSURE

Figure 1:
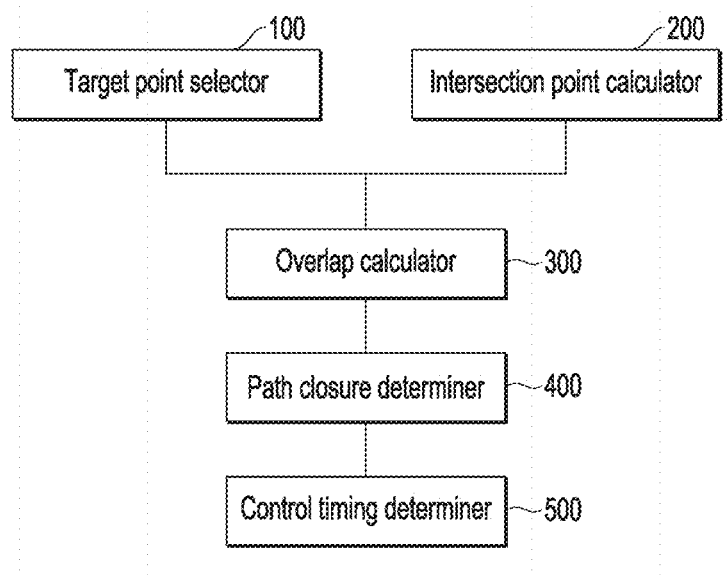
FIG. 1 is a block diagram illustrating a collision avoidance assistance device according to an embodiment of the present disclosure.

Hereinafter, embodiments of the present disclosure are described in detail with reference to the accompanying drawings. The same or similar elements are given the same reference numerals regardless of which drawing they are shown, and redundant descriptions thereof have been omitted. The terms "module," "unit," and/or "-er/or" for referring to elements are assigned and used interchangeably in consideration of the convenience of description. Thus, the terms per se do not necessarily have different meanings or functions. The terms "module," "unit," and/or "-er/or" do not necessarily require physical separation. For example, "OO module, unit, and/or -er/or" and "XX module, unit, and/or -er/or" may be components that perform different functions but may not be physically separated and may perform the functions in parallel or in sequential order in the same microprocessor.

Although terms including ordinal numbers, such as "first," "second," and the like, may be used herein to describe various elements, the elements are not limited by these terms. These terms are only used to distinguish one element from another.

When an element is described as being "coupled" or "connected" to another element, the element may be directly coupled or connected to the other element. However, it is to be understood that another element may be present therebetween. In contrast, when an element is described as being "directly coupled" or "directly connected" to another element, it should be understood that there are no other elements therebetween.

It should be further understood that the terms "comprises/comprising" and/or "includes/including" used herein specify the presence of stated features, integers, steps, operations, elements, and/or components. These terms do not preclude the presence or addition of one or more other features, integers, steps, operations, elements, components and/or groups thereof.

In addition, in the present specification, the control unit or controller described herein may include a communication device configured to communicate with other control units or sensors, a memory configured to store therein an operating system (OS) or logic commands and input/output information, and at least one processor configured to perform determination, calculation or computation, decision, or the like necessary for controlling the functions in charge. Further, when a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-11.

FIG. 1 is a block diagram illustrating a collision avoidance assistance device according to an embodiment of the present disclosure.

Referring to FIG. 1, a collision avoidance assistance device according to an embodiment of the present disclosure may include a target point selector 100 configured to select, as a target point, at least one point present within a vehicle width of a vehicle from among contour points obtained from a light detection and ranging (LiDAR) sensor provided in the vehicle. The device may also include an intersection point calculator 200 configured to determine whether there are intersection points at which line segments, each connecting two contour points, intersect with longitudinal extension lines virtually extended at left and right end points of the vehicle, and to determine a line segment at which the intersection point is present. The device may also include an overlap calculator 300 configured to calculate a degree of overlap between the vehicle and a structure based on the target point and the intersection point. The device may also include a path closure determiner 400 configured to determine a closure degree to which a driving path of the vehicle is closed by a structure recognized by the LiDAR sensor based on the degree of overlap. The device may also include a control timing determiner 500 configured to determine a control time for controlling braking of the vehicle using the closure degree of the driving path and operation information of the driver operating the vehicle.

The target point selector 100 may select, as a target point, a point that satisfies a predetermined condition from among contour points with which a structure present in front of the vehicle, such as a guardrail, is recognizable using data obtained from a front-side LiDAR sensor provided in the vehicle.

The target point selector 100 may calculate a lateral offset value between each of the contour points and the center of a front bumper of the vehicle based on a heading direction of the vehicle. The target point selector 100 may also select, as the target point, a point at which the calculated lateral offset value is within the vehicle width of the vehicle.

Figure 2:
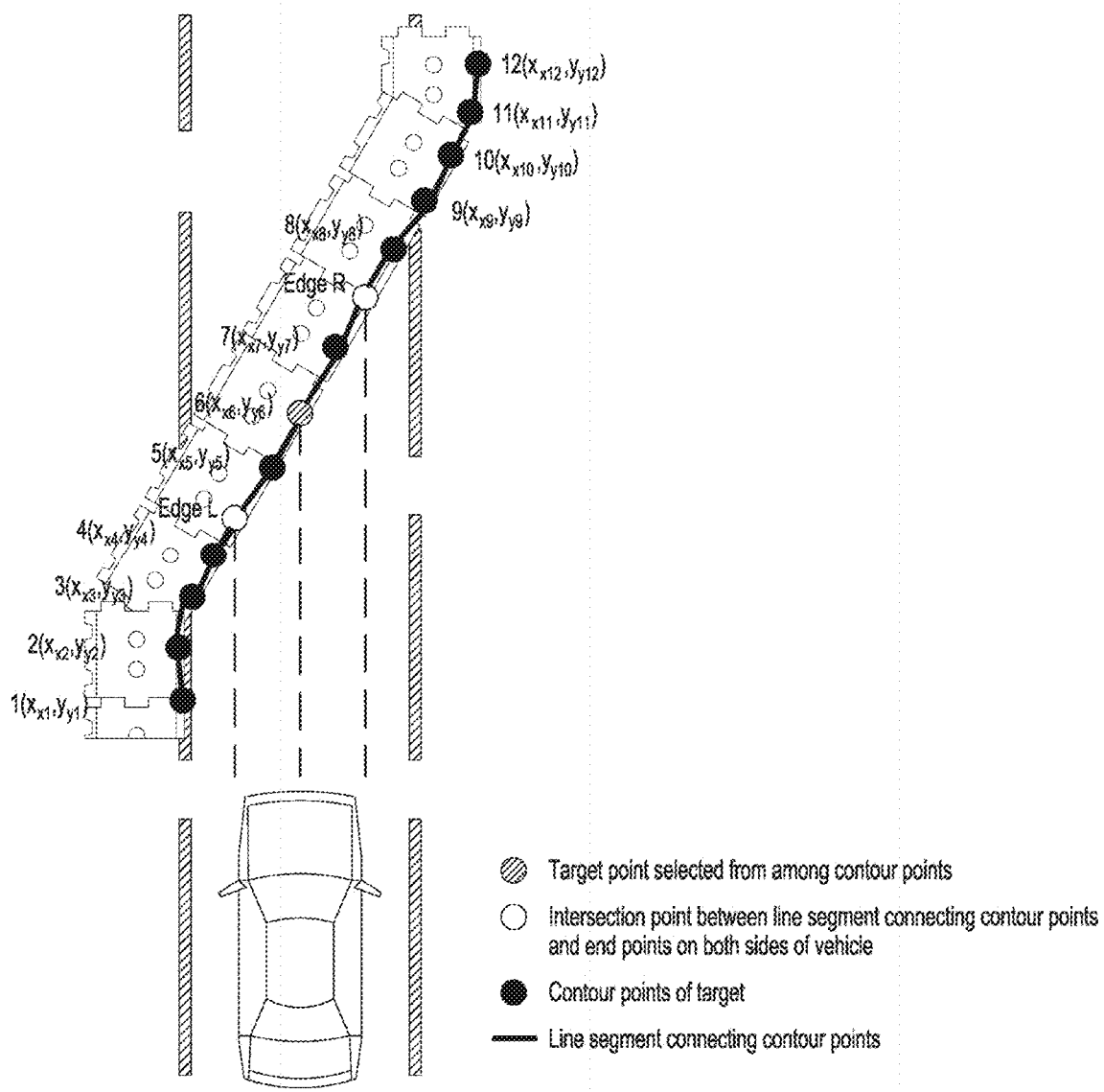
FIG. 2 is a diagram illustrating examples of a selected target point and contour points according to an embodiment of the present disclosure.
Figure 3:
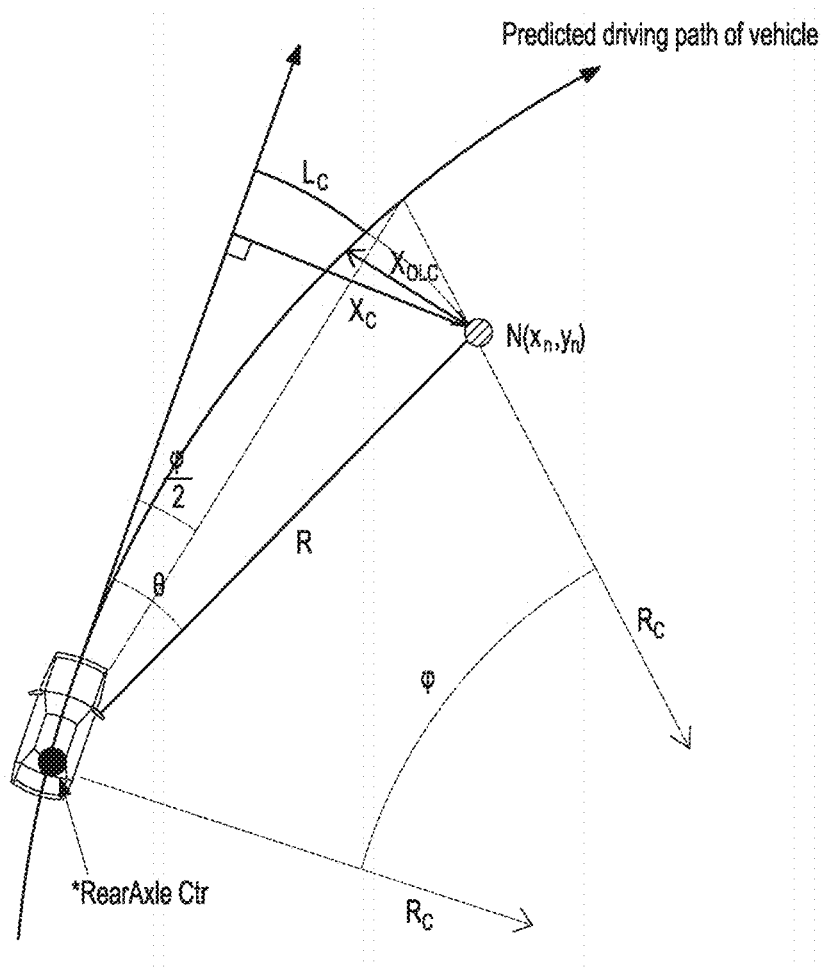
FIG. 3 is an example graph for calculating a lateral offset according to an embodiment of the present disclosure.

FIG. 2 is a diagram illustrating example contour points obtained by a LiDAR sensor, with which a structure is recognizable. FIG. 3 is an example graph illustrating a situation for calculating a lateral offset between the center of a front bumper of a vehicle and each contour point in consideration of a heading angle of the vehicle.

As shown in FIG. 2, the target point selector 100 may obtain, from the LiDAR sensor, contour points of a structure such as a guardrail and a polyethylene (PE) barrier that closes lanes to indicate a construction section.

As shown in FIG. 3, the target point selector 100 may also calculate a lateral offset of each contour point N(xn, yn) based on a direction of the center of the front bumper indicating the heading angle of the vehicle, as expressed in Equation 1 below.

$$\text{Lateral Offset} = X_c - L_c \quad \text{[Equation 1]}$$
$$X_c = R\sin\theta$$
$$L_c = R \cdot \frac{\varphi}{2}$$

In Equation 1, Xc denotes a vertical distance from each contour point to a straight line representing the heading angle of the vehicle, and Lc denotes a distance from a straight line representing the heading angle of the vehicle in a predicted driving path of the vehicle. In addition, R denotes a straight-line distance from the center of a rear axle of the vehicle (RearAxle Ct r) to each contour point (N), Rc denotes the radius of curvature calculated based on the predicted driving path of the vehicle, and θ denotes an angle between the heading direction of the vehicle and each contour point N, and φ/2 denotes half of θ.

If the radius of curvature Rc is greater than 1 (Rc>>1) and an error is not large enough for R and φ to affect the selection of the target point, Equation 1 may be simplified as Equation 2 below.

$$R_c \cdot \varphi = R, \varphi = \frac{R_c}{R} \quad \text{[Equation 2]}$$
$$L_c = \frac{R^2}{2R_C}$$

In addition, using the simplified Equation 2 as described above, the lateral offset of each contour point may be calculated by a predicted curvature (Rprd) relation estimated by a position X (PosX) and a position Y (PosY) representing a lateral distance between the vehicle and a contour point, and a yaw rate and a steering angle of the vehicle, as expressed in Equation 3 below.

$$\text{Lateral Offset} = X_c - L_c = R\sin\theta - \frac{R^2}{2R_C} = PosY - \frac{PosX^2}{2R_{prd}} \quad \text{[Equation 3]}$$

Accordingly, the lateral offset of the contour points from point 1 to point n may be calculated, as expressed in Equation 4 below.

$$\text{Lateral offset of first point} = PosY_1 - \frac{PosX_1^2}{2R_{prd}} \quad \text{[Equation 4]}$$
$$\vdots$$
$$\text{Lateral offset of } nth \text{ point} = PosY_n - \frac{PosX_n^2}{2R_{prd}}$$

The target point selector 100 may select a point at which the calculated lateral offset value is within the width of the vehicle, using the lateral offset of each contour point calculated as expressed in Equation 4 above.

When an absolute value of the calculated lateral offset is less than half $w_{width}/2$ $$(\text{or } \frac{w_{width}}{2})$$

of the vehicle width, the target point selector 100 may set "InpathFlag," a feature value, to 1 such that the point is determined to be located on the driving path of the vehicle (or a host vehicle). Accordingly, referring to FIG. 2, feature values (InpathFlag) of points 5, 6, and 7 may be set to 1.

The target point selector 100 may also select, as the target point, a point having the smallest lateral offset value with respect to the vehicle from among points having the feature value (InpathFlag) of 1. Accordingly, referring to FIG. 2, point 6 has the smallest lateral offset value, and may thus be selected as the target point.

In addition, the intersection point calculator 200 may calculate an intersection point at which a segment, which is a line segment connecting the contour points, and a straight line extending from the left and right end points of the vehicle intersect and may specify a segment of a contour point at which the intersection point is present.

Figure 4:
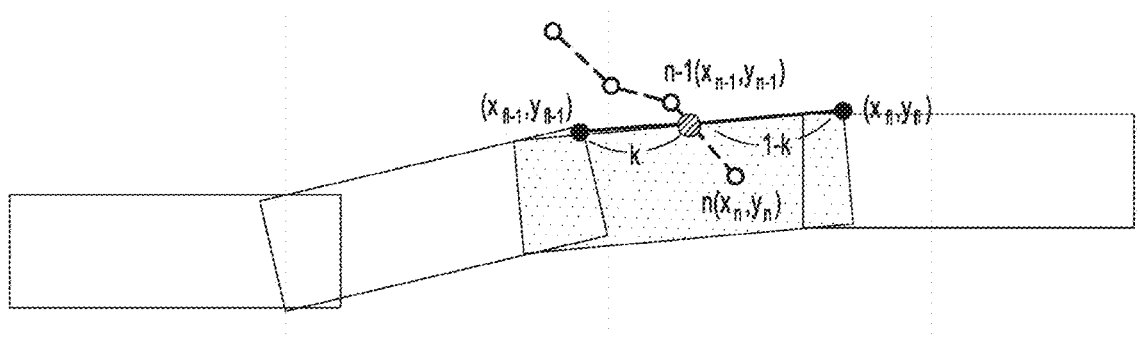
FIG. 4 is a diagram illustrating an example position of a host vehicle for each time sample for calculating an intersection point according to an embodiment of the present disclosure.

As shown in FIG. 4, a line segment (indicated as a dotted line) connecting contour points may intersect with a straight line (indicated as a solid line) extending from the left and right end points of the vehicle. Also, a segment of a contour point at which such an intersection point is present may be specified.

A rectangle shown in FIG. 4 may represent a vehicle specified for each time sample and the straight line extending from the left and right end points of the vehicle may be determined as a straight line that connects a front left end point ($x_{fl-1}$, $y_{fl-1}$) measured at a previous time sample and a front left end point ($x_{fl}$, $y_{fl}$) measured at a current time sample. In this case, fl indicates a "front left" side of the vehicle. A line segment equation related to a line segment connecting these two end points may be determined as expressed in Equation 5 below.

$$y = \frac{y_{fl} - y_{fl-1}}{x_{fl} - x_{fl-1}}(x - x_{fl}) + y_{fl} \quad \text{[Equation 5]}$$

In addition, as shown in FIG. 4, the line segment equation related to a line segment connecting an n−1th contour point n−1 ($x_{n-1}$, $y_{n-1}$) and an nth contour point n ($x_n$, $y_n$) may be determined as expressed in Equation 6 below.

$$y = \frac{y_n - y_{n-1}}{x_n - x_{n-1}}(x - x_n) + y_n \quad \text{[Equation 6]}$$

An intersection point (xc, yc) that intersects Equations 5 and 6 may be obtained as $x_c = x_{fl-1} + k(x_{fl} - x_{fl-1})$ and $y_c = y_{fl-1} + k(y_{fl} - y_{fl-1})$, and "k" may be calculated as expressed in Equation 7 below using this intersection point.

$$k = \frac{(y_n - y_{n-1})(x_{n-1} - x_{fl-1}) - (y_{n-1} - y_{fl-1})(x_n - x_{n-1})}{(y_{fl} - y_{fl-1})(x_{n-1} - x_n) - (x_{fl-1} - x_{fl})(y_n - y_{n-1})} \quad \text{[Equation 7]}$$

When a value of k calculated by Equation 7 is 0<k<1, it may be determined that an intersection point exists and the intersection point (xc, yc) may be determined using the calculated value of k.

Referring to FIG. 2, Edge L and Edge R, which are intersection points of a line segment of a contour point where n is 5 and a line segment of a contour point where n is 8, may be specified. Although FIG. 2 shows an example case in which there are two intersection points, there may also be cases where there are no intersection points or there is only one intersection point, as is described below.

In addition, the overlap calculator 300 may calculate whether the vehicle overlaps with a structure and a degree of overlap, using the lateral offset of the target point and the intersection point.

For a target point, the overlap calculator 300 may calculate the degree of overlap by dividing, by the vehicle width ($w_{width}$), a difference between half ($w_{width}/2$) of the vehicle width ($w_{width}$) of the vehicle and the lateral offset at the target point, as expressed in Equation 8 below. Also, in the case of an intersection point represented by Edge L and Edge R, since it is the end point of the vehicle, the degree of overlap may be always zero (0) %.

$$\text{Point 6 Overlap} = \frac{\frac{w_{width}}{2} - \text{Lateral offset}}{w_{width}} \times 100 \ (\%) \quad \text{[Equation 8]}$$

Edge L, R Overlap=always 0% as it is an end point of a host vehicle

In addition, the path closure determiner 400 may determine whether there is an intersection point specified by the intersection calculator 200 and a closure degree to which the driving path is closed by a structure in front of the vehicle based on the number of intersection points and positions thereof.

When an intersection point is present on both the left side (Edge L) and the right side (Edge R) of the vehicle, the path closure determiner 400 may determine that a structure in front blocks the entire path of the vehicle. When there is no intersection point, the path closure determiner 400 may determine that a structure in front does not block the path of the vehicle.

In addition, when an intersection point is present only on either the left side (Edge L) or the right side (Edge R) of the vehicle, the path closure determiner 400 may determine that a structure in front blocks only part of the path of the vehicle.

In addition, the control timing determiner 500 may determine a control time for controlling the braking of the vehicle based on the degree of overlap between the target point and the intersection point determined by the overlap calculator 300 and the closure degree to which a structure in front closes the path of the vehicle.

Figure 5A:
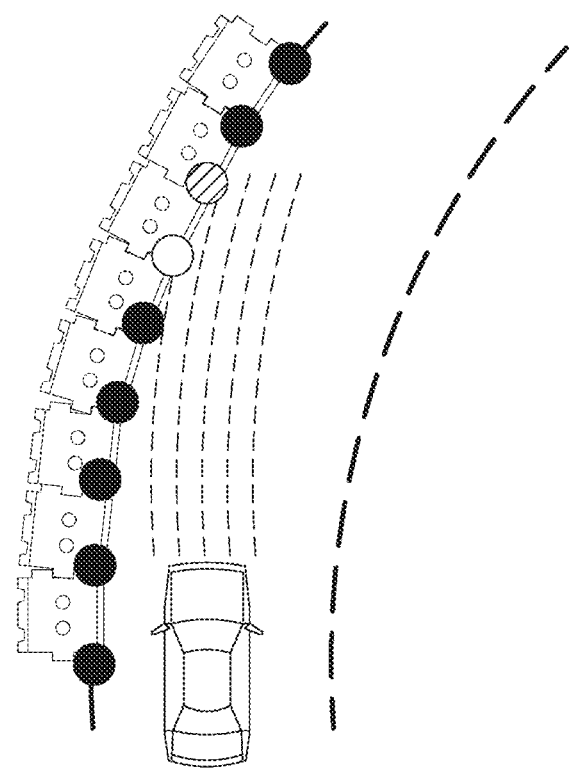
FIGS. 5A and 5B are diagrams illustrating examples of a degree of overlap of an intersection point according to an embodiment of the present disclosure.
Figure 5B:
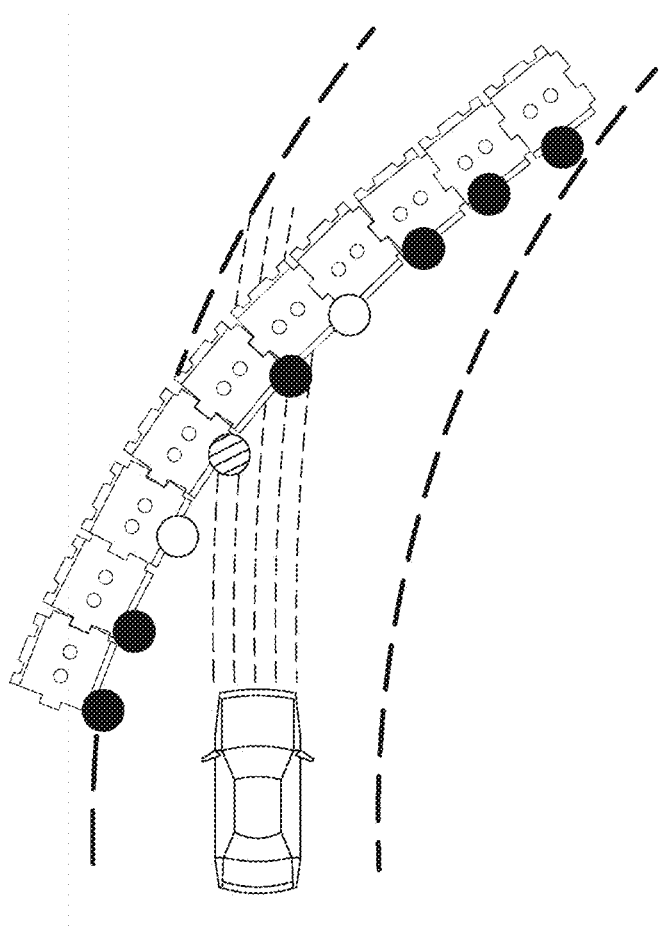

Also, there may be a case in which, on a curved road as shown in FIG. 5A, a path on which the vehicle travels, a heading angle of the vehicle changes later than the radius of curvature of the road. In such h a case, due to limited recognition performance of the sensor, a position of a contour point may be recognized inside the path of the vehicle.

In addition, when the degree of overlap with a contour point is relatively low, a structure may be avoided by the control by, for example, an operation of the driver or a lane keeping function provided in the vehicle. As used herein, the terms "high", "low", "relatively high", and "relatively low" may equate to predetermined threshold or reference values that are set for an acceptable or perceived safe degree of overlap with a contour point or other such characteristic.

Accordingly, the control timing determiner 500 may vary a time at which the collision avoidance assistance device provided in the vehicle controls the uniform execution of braking control of the vehicle according to the degree of overlap with a structure in front and executes the braking control based on whether the path is curved or not, the degree of overlap, a driver's vehicle operation situation, or the like.

When it is determined that a structure in front blocks the entire path of the vehicle, the control timing determiner 500 may execute the braking control to prevent a collision because, in such a case, avoidance is difficult. However, the control timing determiner 500 may vary such a control time by, for example, delaying a time for executing the braking control or the like in consideration of the driver's vehicle operation situation.

The control timing determiner 500 may determine a risk of collision based on a driving state of the vehicle (e.g., whether the vehicle is speeding up, decelerating, or steering), a driving state of the driver, a road environment, or the like, and may determine whether to vary the control time based on the risk of collision.

Figure 6:
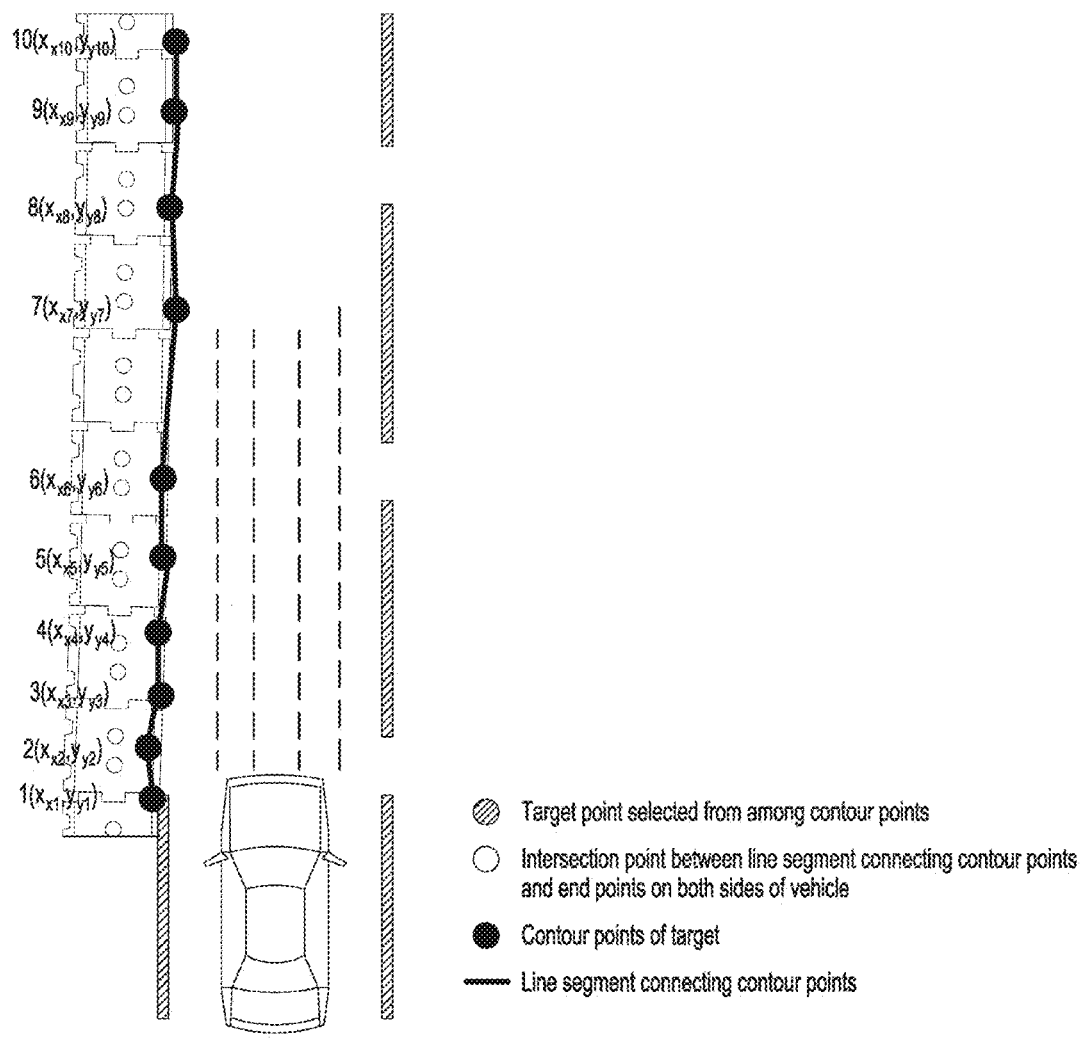
FIG. 6 is a diagram illustrating an example case in which a structure is present outside a driving path of a vehicle.

For example, as shown in FIG. 6, when a structure such as a guardrail is located outside the path of the vehicle and the target point is not present within the path of the vehicle, and when there is no intersection point between a line segment connecting contour points of the structure and the end points of the vehicle, the control timing determiner 500 may determine a situation without the risk of collision and determine the braking control not to be operated.

Figure 7:
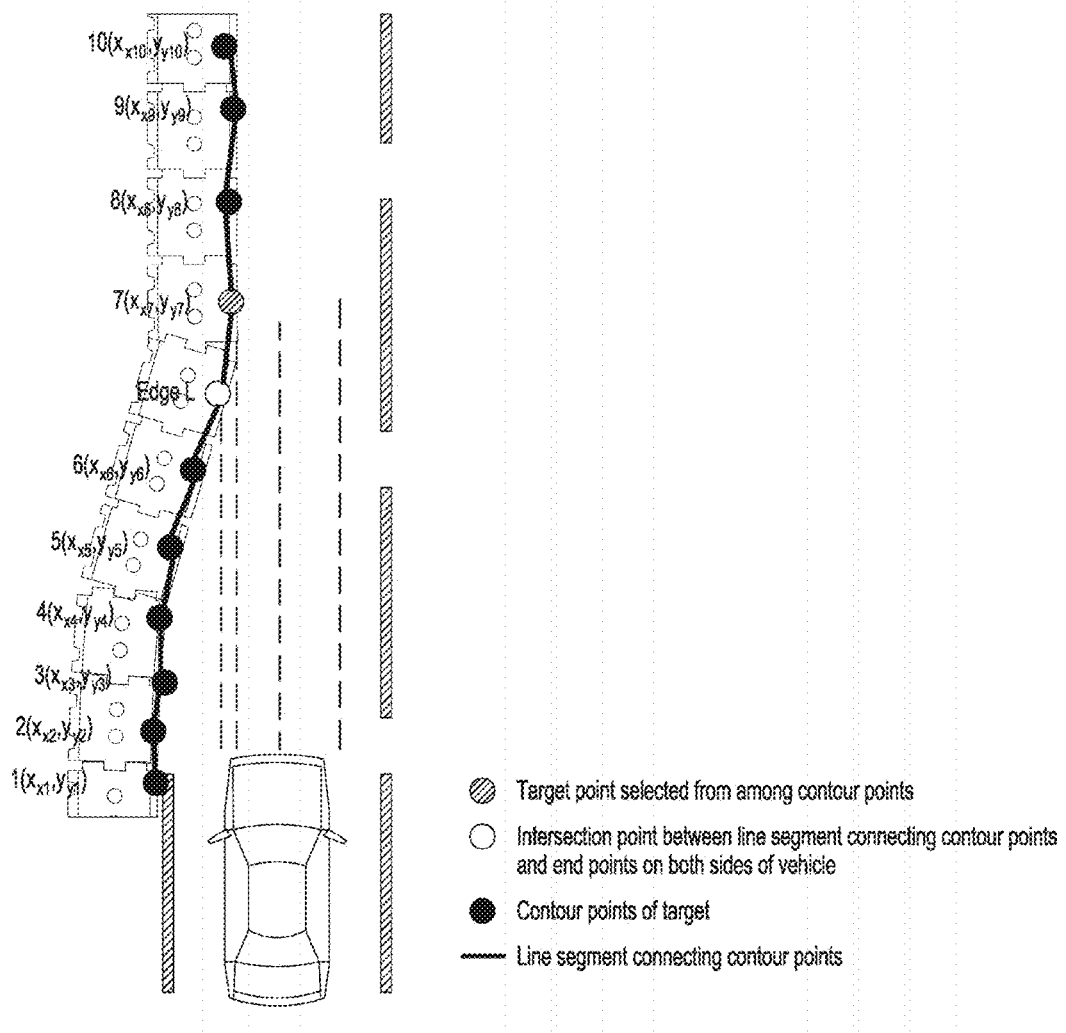
FIG. 7 is a diagram illustrating an example case in which a driving path of a vehicle is partially closed by a structure.

For example, as shown in FIG. 7, when a structure such as a guardrail or a PE barrier blocks a part of the path of the vehicle, point 7 (x7, y7) may be selected as the target point present within the vehicle width. Also, Edge L may be selected as the intersection point with both the left and right end points of the vehicle. However, the intersection point is present only on the left side and the structure does not block the entire path of the vehicle.

Since the intersection point is present only on one side despite the presence of the target point and the intersection point, and since the structure does not block the entire path, the control timing determiner 500 may determine whether there is an avoidable space within lanes based on the degree of overlap of the target point and the intersection point. The control timing determiner 500 may then determine the risk of collision to be low in the presence of the avoidable space.

When it is determined that the risk of collision is low, the control timing determiner 500 may determine that avoidance steering by the driver is available and may determine the control time for the braking control to be executed later than a reference time.

The reference time may be a point in time at which stoppage is available without a collision with a structure by the operation of a brake pedal and may be a value previously set according to the speed of the vehicle.

In addition, when it is determined that there is an insufficient avoidable space within the lanes, although the structure does not block the entire path, based on the degree of overlap, the control timing determiner 500 may determine the risk of collision to be high and determine the braking control to be executed at the reference time.

Figure 8:
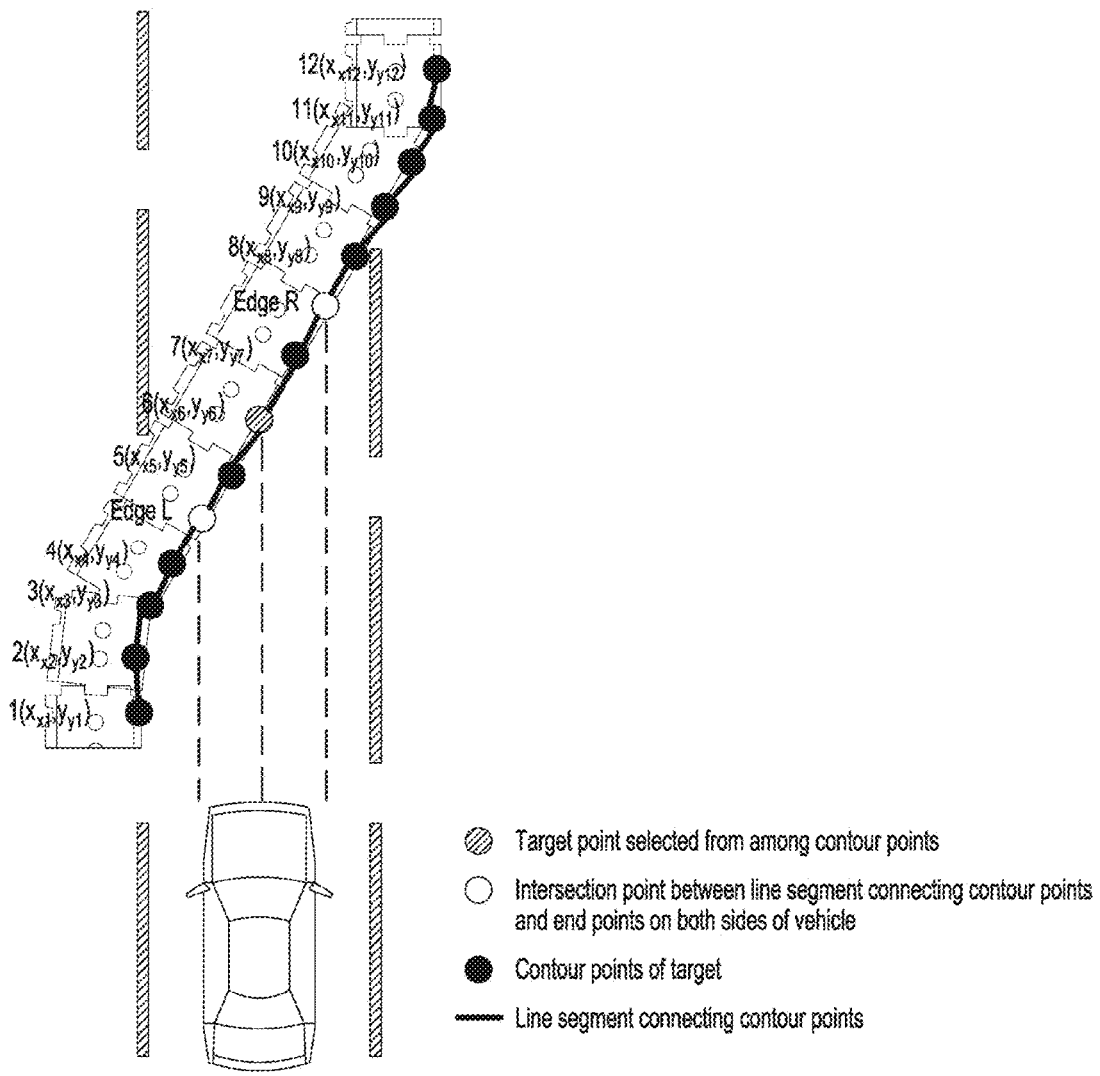
FIG. 8 is a diagram illustrating an example case in which a driving path of a vehicle is entirely closed by a structure.

For example, as shown in FIG. 8, when a structure such as a guardrail or a PE barrier blocks the entire path of the vehicle, point 6 (x6, y6) may be selected as the target point present within the vehicle width. Also, Edge L and Edge R may be selected as the intersection point with both the left and right end points of the vehicle. Further, it may be determined that the structure blocks the entire path of the vehicle because the intersection point is present at both the end points of the vehicle.

When it is determined that the intersection point is present at both end points of the vehicle and the structure blocks the entire path, the control timing determiner 500 may determine the risk of collision to be high because it is difficult to avoid the structure by the driver and determine the braking control to be executed at the reference time for avoiding a collision with the structure.

Figure 9:
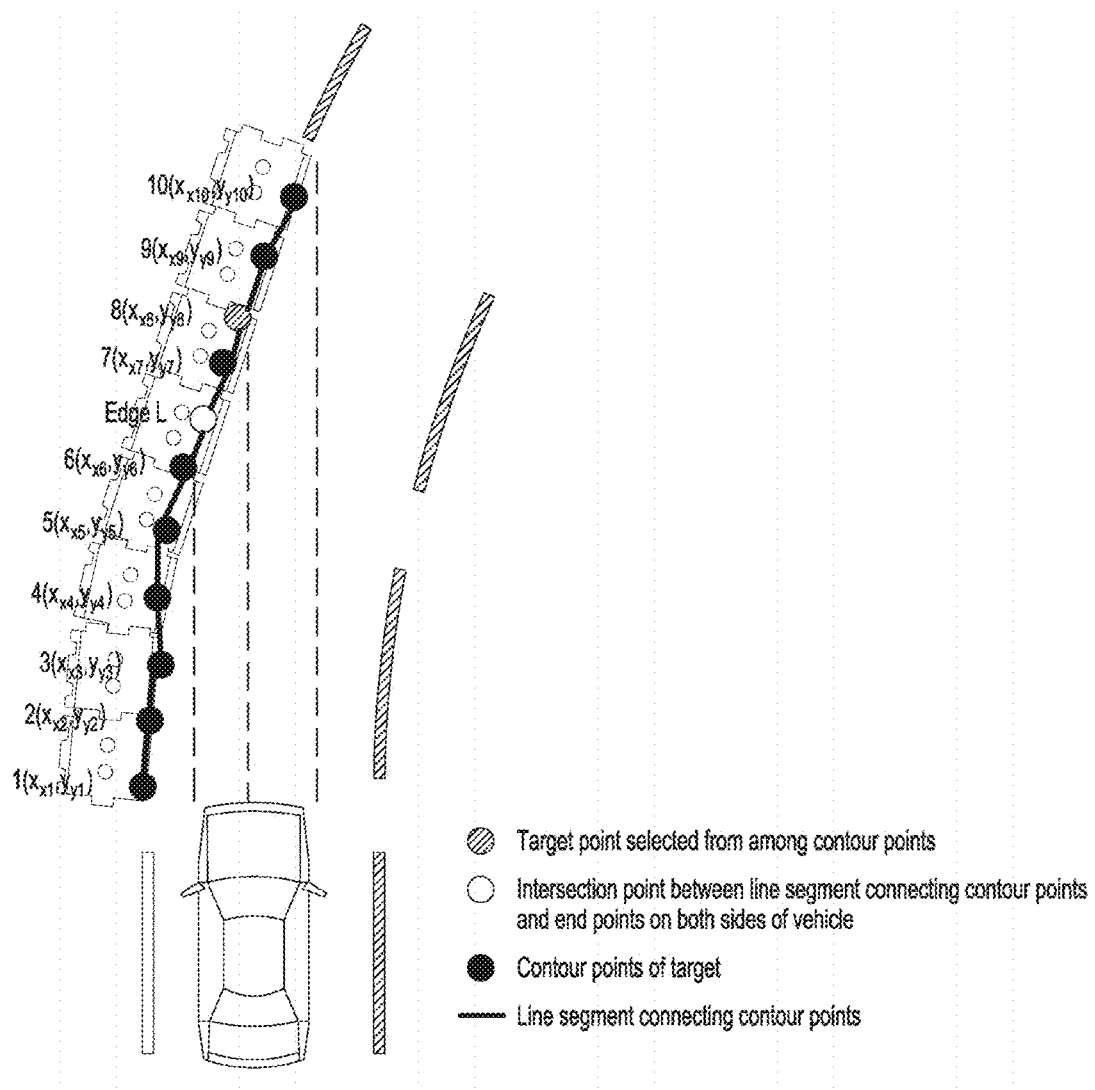
FIG. 9 is a diagram illustrating an example case in which an intersection point overlaps during driving on a curved road.

For example, as shown in FIG. 9, when a structure such as a guardrail or a PE barrier blocks a part of the path of the vehicle, but the vehicle is driving on a curved road, point 8 (x8, y8) may be selected as the target point present within the vehicle width of the vehicle. Also, Edge L may be selected as the intersection point with both the left and right end points of the vehicle. However, the intersection point is present only on the left side. Thus, it is determined that the structure does not block the entire driving path on which the vehicle is traveling.

The control timing determiner 500 may determine the risk of collision to be low when there is an avoidable space based on the degree of overlap between the target point and the intersection point. This is because, despite the presence of the target point and the intersection point, the intersection point is present only on one side and does not block the entire path.

In addition, when the road on which the vehicle is traveling is a curved road, the control timing determiner 500 may determine that there is a possibility that the driver will steer according to a change in curvature of the road. If there are no other obstacles or structures in a predicted steering space according to the change in curvature of the curved road, the control timing determiner 500 may determine that the risk of collision with a structure generating the intersection point is low.

When it is determined that the risk of collision with a structure, while the vehicle is traveling on the curved road, is low, the control timing determiner 500 may determine the braking control to be executed at a time later than the reference time.

Figure 10:
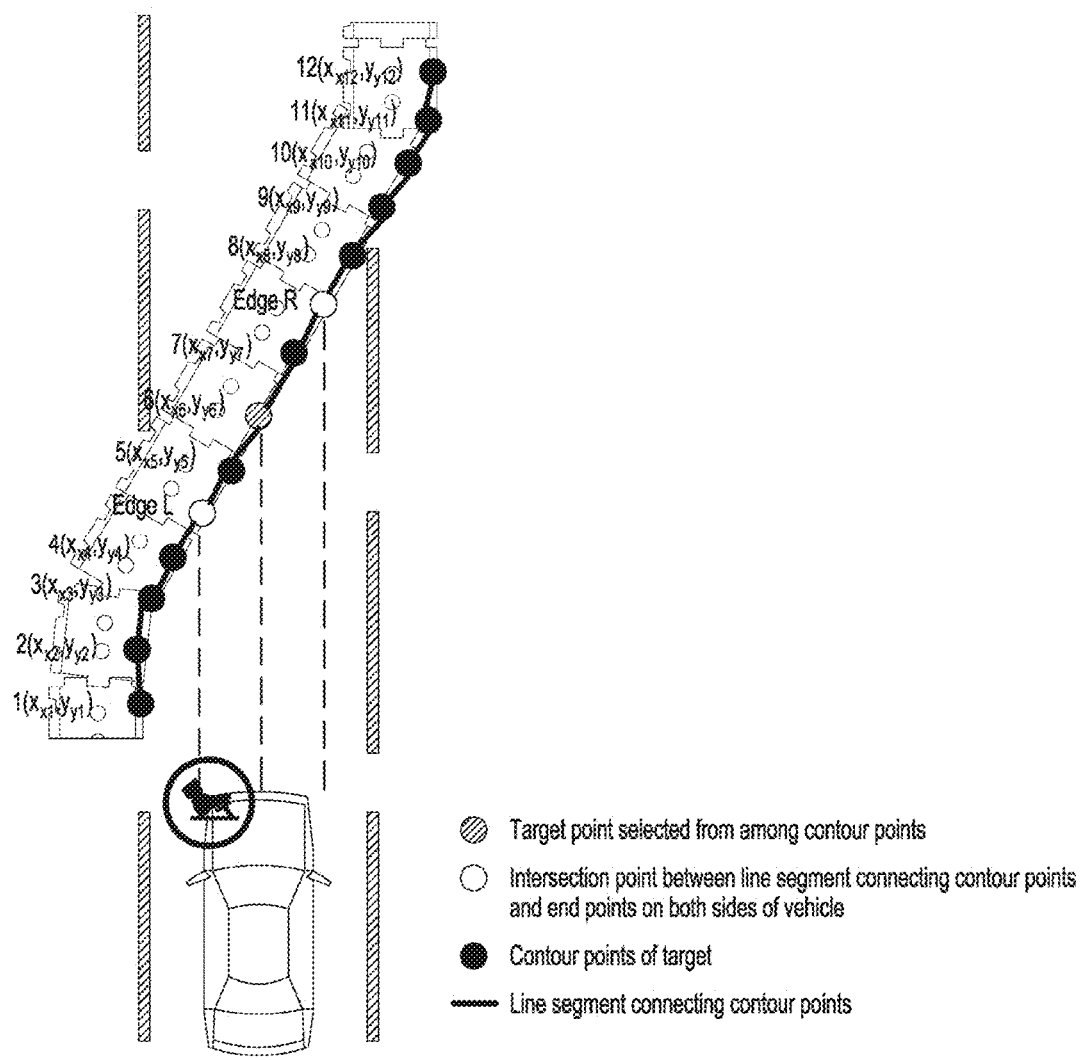
FIG. 10 is a diagram illustrating an example case in which a driver operates a brake pedal.

For example, as shown in FIG. 10, when it is determined that the driver is braking by stepping on the brake pedal, even though a structure is blocking the entire path of the vehicle (FIG. 10 shows the driver stepping on the brake pedal, on one side of the vehicle), the control timing determiner 500 may determine the risk of collision to be low and determine the braking control to be executed at a time later than the reference time.

Figure 11:
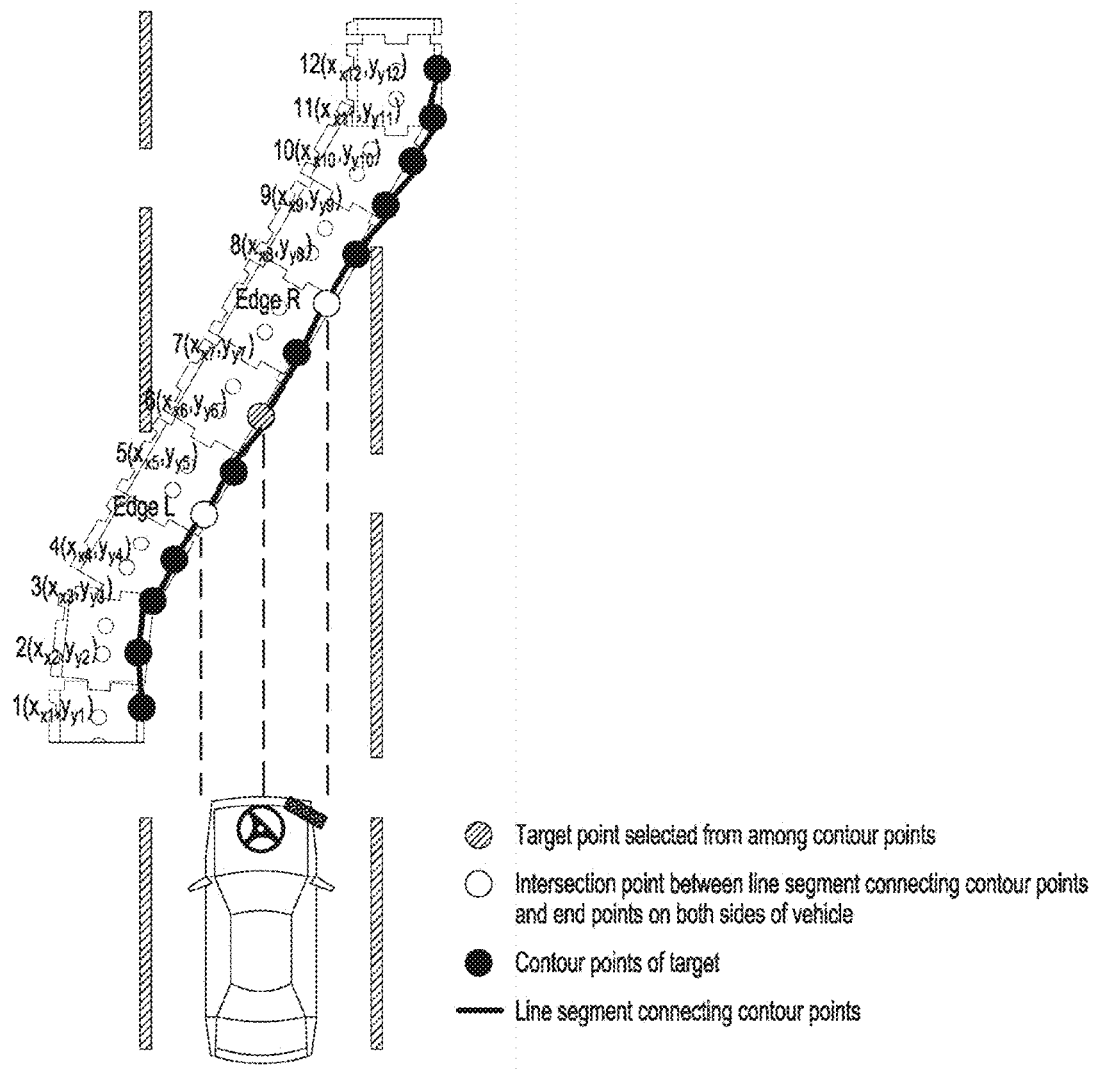
FIG. 11 is a diagram illustrating an example case in which a driver operates steering.

For example, as shown in FIG. 11, when it is determined that the driver is turning on a turn signal lamp and steering, even though a structure is blocking the entire path of the vehicle (FIG. 11 shows the steering wheel being turned to the right, at the center of the vehicle), the control timing determiner 500 may determine the risk of collision to be low because the driver is attempting avoidance and determine the braking control to be executed at a time later than the reference time.

As described above, according to embodiments, varying a braking control time of a vehicle based on a degree to which a structure such as a guardrail, a lane separation bar, a steel median strip, or a PE barrier that is sensed as being present on a front side by a front-side LiDAR sensor provided in the vehicle closes a driving path of the vehicle may improve driving safety.

In addition, according to embodiments, selecting a representative value for recognizing a long-extending structure as a target point, selected based on a lateral offset with the center of a front bumper of a vehicle, may prevent the collision avoidance assistance device from being sensitively controlled or erroneously controlled.

In addition, according to embodiments, maintaining or delaying, based on a reference time, a time at which braking control is to be executed according to a degree to which a structure blocks a driving path of a vehicle, or according to a risk of collision determined based on a braking operation or steering operation by the driver, or the like, may enable the braking control without a sense of difference according to the driving intention of the driver.

Hereinafter, a collision avoidance assistance method according to another embodiment of the present disclosure is described in detail with reference to FIGS. 12 and 13.

Figure 12:
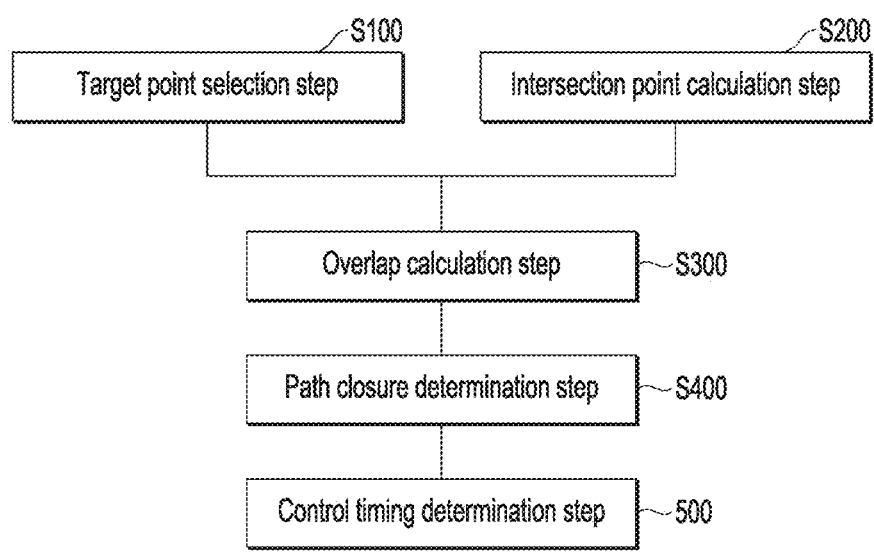
FIG. 12 is a diagram illustrating a collision avoidance assistance method according to another embodiment of the present disclosure.

FIG. 12 is a diagram illustrating a collision avoidance assistance method according to another embodiment of the present disclosure. FIG. 13 is a flowchart illustrating a mechanism by which a collision avoidance assistance method is executed according to an embodiment of the present disclosure.

Figure 13:
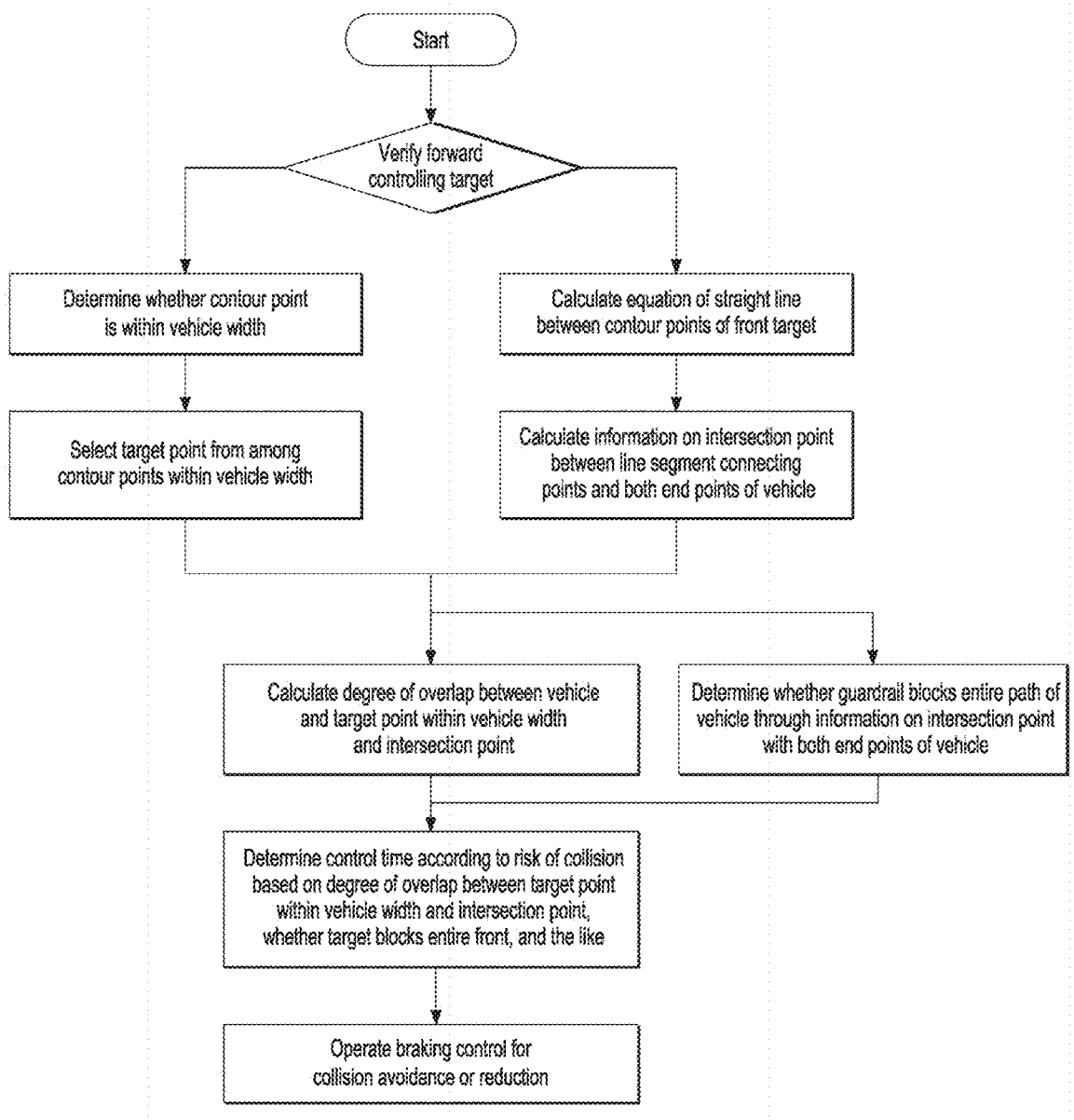
FIG. 13 is a flowchart illustrating a mechanism by which a collision avoidance assistance method is executed according to an embodiment of the present disclosure.

Referring to FIGS. 12 and 13, the collision avoidance assistance method according to another embodiment of the present disclosure may include a target point selection step S100 of selecting, as a target point, at least one point present within a vehicle width of a vehicle from among contour points obtained from a LiDAR sensor provided in the vehicle. The method may also include an intersection point calculation step S200 of determining whether there is an intersection point at which a line segment, connecting the contour points, intersects with longitudinal extension lines of left and right end points of the vehicle, and of specifying a line segment of a contour point at which the intersection point is present. The method may also include an overlap calculation step S300 of calculating a degree of overlap between the vehicle and a structure based on the target point and the intersection point. The method may also include a path closure determination step S400 of determining a closure degree to which a driving path of the vehicle is closed by a structure recognized by the LiDAR sensor based on the degree of overlap. The method also includes a control timing determination step S500 of determining a control time for controlling braking of the vehicle, using the closure degree of the driving path and operation information of the driver operating the vehicle.

The target point selection step S100 may include selecting, as the target point, a point that satisfies predetermined conditions from among the contour points used to recognize a structure such as a guardrail present in front of the vehicle, using data obtained from a front-side LiDAR sensor provided in the vehicle.

The target point selection step S100 may include calculating a lateral offset value between each of the contour points and the center of a front bumper of the vehicle in consideration of a heading angle of the vehicle, and may include selecting, as the target point, a point at which the calculated lateral offset value is within the vehicle width of the vehicle.

The target point selection step S100 may include, after obtaining, from the LiDAR sensor, the contour points for a structure such as a guardrail and a PE barrier that closes lanes to indicate a construction section, calculating a lateral offset of each contour point $N(x_n, y_n)$ based on a direction of the center of the front bumper indicating the heading angle of the vehicle.

The target point selection step S100 may also include calculating a lateral offset of each contour point by a predicted curvature Rprd relation estimated by a position X (PosX) and a position Y (PosY) representing a lateral distance between the vehicle and a contour point, and by a yaw rate and a steering angle of the vehicle.

The target point selection step S100 may also include selecting a point at which the calculated lateral offset value is within the width of the vehicle, using the lateral offset of each contour point. The target point selection step S100 may also include selecting, as the target point, a point having the smallest lateral offset value with respect to the vehicle.

In addition, the intersection point calculation step S200 may include calculating an intersection point at which a segment, which is a line segment connecting the contour points, intersects with a straight line extending from the left and right end points of the vehicle, and may include specifying a segment of a contour point at which the intersection point is present.

The line segment connecting the contour points may intersect the straight line extending from the left and right end points of the vehicle. A segment of a contour point where such an intersection point exists may be specified.

In addition, the overlap calculation step S300 may include calculating whether the vehicle overlaps a structure and a degree of overlap, using the lateral offset of the target point and the intersection point.

The overlap step calculation S300 may include calculating the degree of overlap by dividing, by the vehicle width ($w_{width}$) Of the vehicle, a difference between half $w_{width}/2$ of the vehicle width of the vehicle and the lateral offset at the target point, for the target point. In addition, for the intersection point represented by Edge L and Edge R, it is the end points of the vehicle, and the degree of overlap may always be zero (0) %.

In addition, the path closure determination step S400 may include determining a closure degree to which the driving path of the vehicle is closed by a structure in front of the vehicle based on whether the intersection point specified in the intersection point calculation step S200 exists and based on the number of intersection points and positions thereof.

The path closure determination step S400 may include determining that a structure in front blocks the entire path of the vehicle when the intersection point is present on both the left side (Edge L) and the right side (Edge R) of the vehicle. The path closure determination step S400 may also include determining that a structure in front does not block the path of the vehicle when there is no intersection point.

The path closure determination step S400 may also include determining that a structure in front blocks only a part of the path of the vehicle when the intersection point is present only on either the left side (Edge L) or the right side (Edge R) of the vehicle.

In addition, the control timing determination step S500 may include determining a control time for controlling braking of the vehicle based on the degree of overlap of the target point and the intersection point determined in the overlap calculation step S300 and based on the closure degree to which the structure in front closes the path of the vehicle.

When the degree of overlap with a contour point is relatively low, the structure may be avoided under control by an operation by the driver and a lane keeping function provided in the vehicle.

Accordingly, the control timing determination step S500 may then include controlling the collision avoidance assistance device provided in the vehicle to uniformly control the braking of the vehicle according to the degree of overlap with the structure in front. The control timing determination step S500 may also include varying a time at which it executes the braking control of the vehicle based on whether the path is curved, the degree of overlap, a driver's vehicle operation situation, or the like.

When it is determined that the structure in front blocks the entire path of the vehicle and avoidance is difficult, the control timing determination step S500 may include executing the braking control to prevent a collision. However, a braking control execution time may be varied or delayed in consideration of the driver's vehicle operation situation.

The control timing determination step S500 may include determining a risk of collision based on a driving state of the vehicle (e.g., a vehicle speed of the vehicle, deceleration, steering, and the like), a driving state of the driver, or a road condition or environment. The control determination step S500 may also include determining whether to vary the control time based on the risk of collision.

For example, as shown in FIG. 6, when a structure such as a guardrail is located outside the path of the vehicle and the target point is not present within the path of the vehicle, and there is no intersection point between a line segment connecting contour points of the structure and both end points of the vehicle, the control timing determination step S500 may include determining such a case as a situation without a risk of collision and determining the braking control not to operate.

In addition, as shown in FIG. 7, when a structure such as a guardrail or a PE barrier blocks a part of the path of the vehicle, the control timing determination step S500 may include determining whether there is an avoidable space within lanes based on the degree of overlap of the target point and the intersection point because the intersection point is present only on one side without blocking the entire path despite the presence of the target point and the intersection point. The control timing determination step S500 may also include then determining the risk of collision to be low in the presence of the avoidable space.

The control timing determination step S500 may include determining that avoidance steering by the driver is possible when determining the risk of collision to be low and determining the control time to be later than a reference time such that the braking control is to be executed later than the reference time.

The reference time may refer to a point in time at which stoppage is available without a collision with a structure by the operation of a brake pedal of the vehicle and may be a value previously set according to the speed of the vehicle.

In addition, when it is determined that there is an insufficient avoidable space within the lanes based on the degree of overlap, even though the structure does not block the entire path, the control time determination step S500 may include determining the risk of collision to be high and determining the braking control to be executed at the reference time.

In addition, as shown in FIG. 8, when a structure such as a guardrail or a PE barrier blocks the entire path of the vehicle, the control timing determination step S500 may include determining the risk of collision to be high because the intersection point is present at both end points of the vehicle and the structure blocks the entire path. The control timing determination step S500 may also include determining the braking control for preventing a collision with the structure to be executed at the reference time.

In addition, as shown in FIG. 9, when a structure such as a guardrail or a PE barrier blocks a part of the path of the vehicle, but the vehicle is driving on a curved road, the control timing determination step S500 may include determining that there is a possibility that the driver will steer according to a change in curvature of the road in the case of the curved road. The control timing determination step S500 may also include determining the risk of collision with the structure generating the intersection point to be low when there are no other obstacles or structures in a predicted steering space.

Accordingly, when it is determined that the risk of collision with a structure while driving on a curved road is low, the control timing determination step S500 may include determining the braking control to be executed at a time later than the reference time.

In addition, as shown in FIG. 10, when it is determined that the driver is braking by stepping on the brake pedal, even though a structure is blocking the entire path of the vehicle, the control timing determination step S500 may include determining the risk of collision to be low and determining the braking control to be executed at a time later than the reference time.

In addition, as shown in FIG. 11, when it is determined that the driver is turning on a turn signal lamp and steering, even though a structure is blocking the entire path of the vehicle, the control timing determination step S500 may include determining the risk of collision to be low because the driver is attempting avoidance and determining the braking control to be executed at a time later than the reference time.

The present disclosure described above may be embodied as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a read-only memory (ROM), a random-access memory (RAM), a CD-ROM, a magnetic tape, a floppy disk, an optical data storage device, and the like.

The foregoing detailed description should not be construed as restrictive but instead should be considered illustrative in all respects. The scope of the present disclosure should be determined by a reasonable interpretation of the appended claims, and all modifications within the equivalent scope of the present disclosure are considered included in the scope of the present disclosure.

What is claimed is:

1. A collision avoidance assistance device, comprising:
   a target point selector configured to select, as a target point, at least one point present within a vehicle width of a vehicle from among contour points obtained from a light detection and ranging (LiDAR) sensor provided in the vehicle;
   an intersection point calculator configured to determine whether there are intersection points at which line segments, each connecting two contour points, intersect with longitudinal extension lines of left and right end points of the vehicle, and determine the line segments of the intersection points;
   an overlap calculator configured to calculate a degree of overlap between the vehicle and a structure based on the target point and the intersection points;
   a path closure determiner configured to determine a closure degree to which a driving path of the vehicle is closed by the structure recognized by the LiDAR sensor based on the degree of overlap; and
   a control timing determiner configured to determine a control time for braking control of the vehicle using the closure degree of the driving path and operation information of a driver operating the vehicle.

2. The collision avoidance assistance device of claim 1, wherein the target point selector is further configured to:
   based on a heading direction of the vehicle, calculate a lateral offset value between each of the contour points and a center of a front bumper of the vehicle; and
   select, as the target point, a point at which the calculated lateral offset value is within the vehicle width of the vehicle.

3. The collision avoidance assistance device of claim 1, wherein the target point selector is further configured to:
   select, as the target point, a point having a smallest lateral offset value with respect to the vehicle.

4. The collision avoidance assistance device of claim 1, wherein the overlap calculator is further configured to:
   calculate the degree of overlap by dividing, by the vehicle width ($w_{width}$), a difference between half ($w_{width}/2$) of the vehicle width of the vehicle and a lateral offset at the target point.

5. The collision avoidance assistance device of claim 1, wherein the path closure determiner is further configured to:
   determine that a structure in front is blocking an entirety of the path of the vehicle when the intersection point is present both on a left side (Edge L) and a right side (Edge R) of the vehicle; and/or
   determine that the structure in front is blocking only a portion of the path of the vehicle when the intersection point is present on one of the left side (Edge L) and the right side (Edge R) of the vehicle.

6. The collision avoidance assistance device of claim 1, wherein the control timing determiner is further configured to:
   determine a risk of collision based on a driving state of the vehicle, a driving state of the driver, or a road environment; and
   determine whether to vary the control time based on the risk of collision.

7. The collision avoidance assistance device of claim 6, wherein the control timing determiner is further configured to:
   determine whether there is an avoidable space within a lane based on the degree of overlap of the target point and the intersection point when the intersection point is present only on one side of the vehicle without blocking the entire path of the vehicle;
   determine the risk of collision to be low in the presence of the avoidable space; and
   determine the control time such that the braking control is executed later than a preset reference time.

8. The collision avoidance assistance device of claim 6, wherein the control timing determiner is further configured to:
   when there are no other obstacles or structures in a predicted steering space according to a change in curvature of a curved road on which the vehicle travels, determine the risk of collision with a structure generating the intersection point to be low; and determine the braking control to be executed at a time later than a preset reference time.

9. The collision avoidance assistance device of claim 6, wherein the control timing determiner is further configured to:

when it is determined that, even though a structure is blocking the entire path of the vehicle, the driver is braking by stepping on a brake pedal of the vehicle, determine the risk of collision to be low; and determine the braking control to be executed at a time later than a preset reference time.

10. The collision avoidance assistance device of claim 6, wherein the control timing determiner is further configured to:

when it is determined that, even though a structure is blocking the entire path of the vehicle, the driver is steering with a turn signal on, determine the risk of collision to be low; and determine the braking control to be executed at a time later than a preset reference time.

11. A collision avoidance assistance method, comprising:

a target point selection step of selecting, as a target point, at least one point present within a vehicle width of a vehicle from among contour r points obtained from a light detection and ranging (LiDAR) sensor provided in the vehicle;

an intersection point calculation step of determining whether there are intersection points at which line segments, each connecting two contour points, intersect with longitudinal extension lines of left and right end points of the vehicle, and of determining the line segments of the intersection points;

an overlap calculation step of calculating a degree of overlap between the vehicle and a structure based on the target point and the intersection point;

a path closure determination step of determining a closure degree to which a driving path of the vehicle is closed by the structure recognized by the LiDAR sensor based on the degree of overlap; and a control timing determination step of determining a control time for braking control of the vehicle using the closure degree of the driving path and operation information of a driver operating the vehicle.

12. The collision avoidance assistance method of claim 11, wherein the target point selection step further comprises:

based on a heading angle of the vehicle, calculating a lateral offset value between each of the contour points and a center of a front bumper of the vehicle; and selecting, as the target point, a point at which the calculated lateral offset value is within the vehicle width of the vehicle.

13. The collision avoidance assistance method of claim 11, wherein the target point selection step further comprises:

selecting, as the target point, a point having the smallest lateral offset value with respect to the vehicle.

14. The collision avoidance assistance method of claim 11, wherein the overlap calculation step further comprises:

calculating the degree of overlap by dividing, by the vehicle width ($w_{width}$), a difference between half ($w_{width}/2$) of the vehicle width of the vehicle and a lateral offset at the target point.

15. The collision avoidance assistance method of claim 11, wherein the path closure determination step further comprises:

determining that a structure in front is blocking an entirety of the path of the vehicle when the intersection point is present both on a left side (Edge L) and a right side (Edge R) of the vehicle; and/or determining that the structure in front is blocking only a portion of the path of the vehicle when the intersection point is present on one of the left side (Edge L) and the right side (Edge R) of the vehicle.

16. The collision avoidance assistance method of claim 11, wherein the control timing determination step further comprises:

determining a risk of collision based on a driving state of the vehicle, a driving state of the driver, or a road environment; and determining whether to vary the control time based on the risk of collision.

17. The collision avoidance assistance method of claim 16, wherein the control timing determination step further comprises:

determining whether there is an avoidable space within a lane based on the degree of overlap between the target point and the intersection point when the intersection point is present only on one side without blocking the entire path;

determining the risk of collision to be low in the presence of the avoidable space; and determining the control time such that the braking control is executed later than a preset reference time.

18. The collision avoidance assistance method of claim 16, wherein the control timing determination step further comprises:

when there are no other obstacles or structures in a predicted steering space according to a change in curvature of a curved road on which the vehicle travels, determining the risk of collision with a structure generating the intersection point to be low; and determining the braking control to be executed at a time later than a preset reference time.

19. The collision avoidance assistance method of claim 16, wherein the control timing determination step further comprises:

when it is determined that, even though a structure is blocking the entire path of the vehicle, the driver is braking by stepping on a brake pedal, determining the risk of collision to be low; and determining the braking control to be executed at a time later than a preset reference time.

20. The collision avoidance assistance method of claim 16, wherein the control timing determination step further comprises:

when it is determined that, even though a structure is blocking the entire path of the vehicle, the driver is steering with a turn signal on, determining the risk of collision to be low; and determining the braking control to be executed at a time later than a preset reference time.

* * * * *